March 11, 1958    F. M. M. B. SALOMON    2,826,285
TRANSMISSION SYSTEM ADAPTED TO FORM A TORQUE CONVERTER
Filed July 31, 1956      5 Sheets-Sheet 1
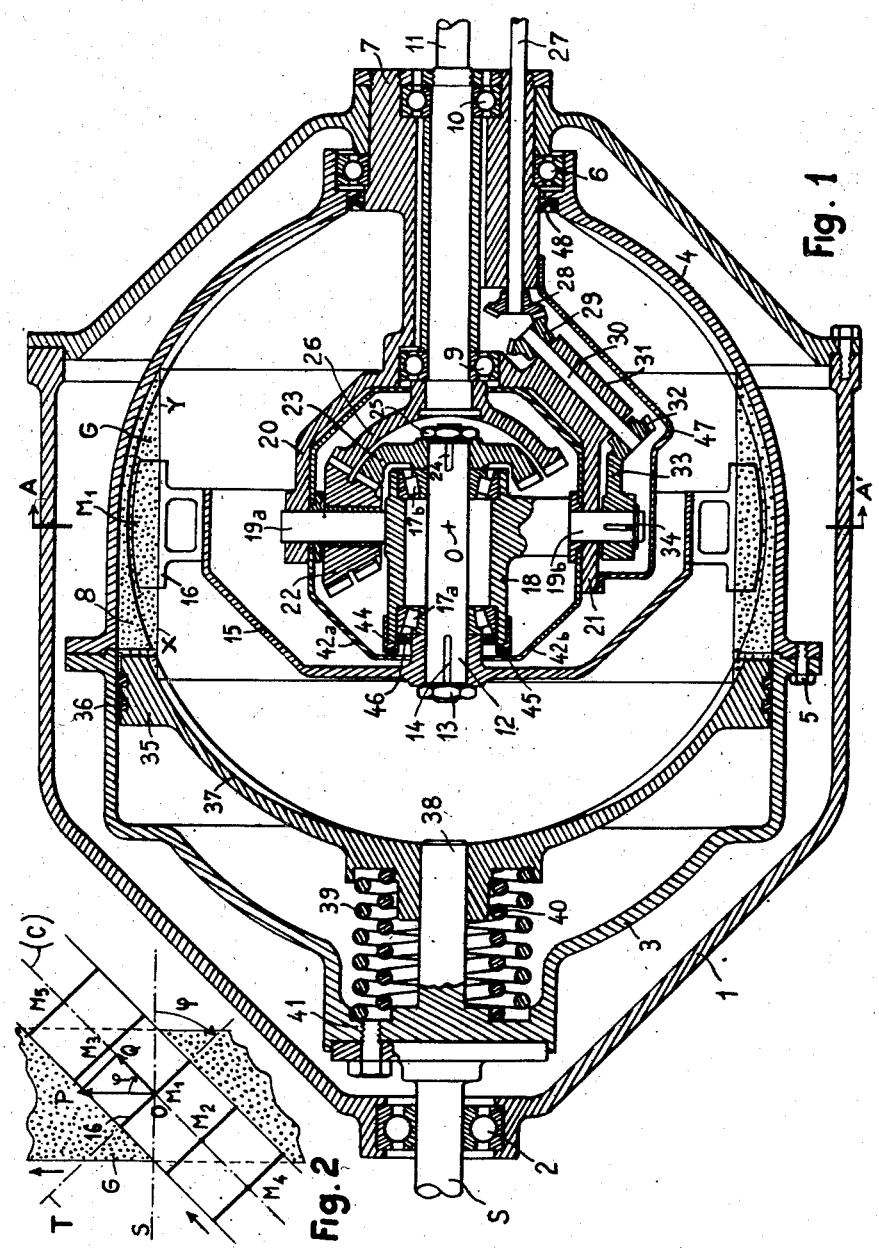

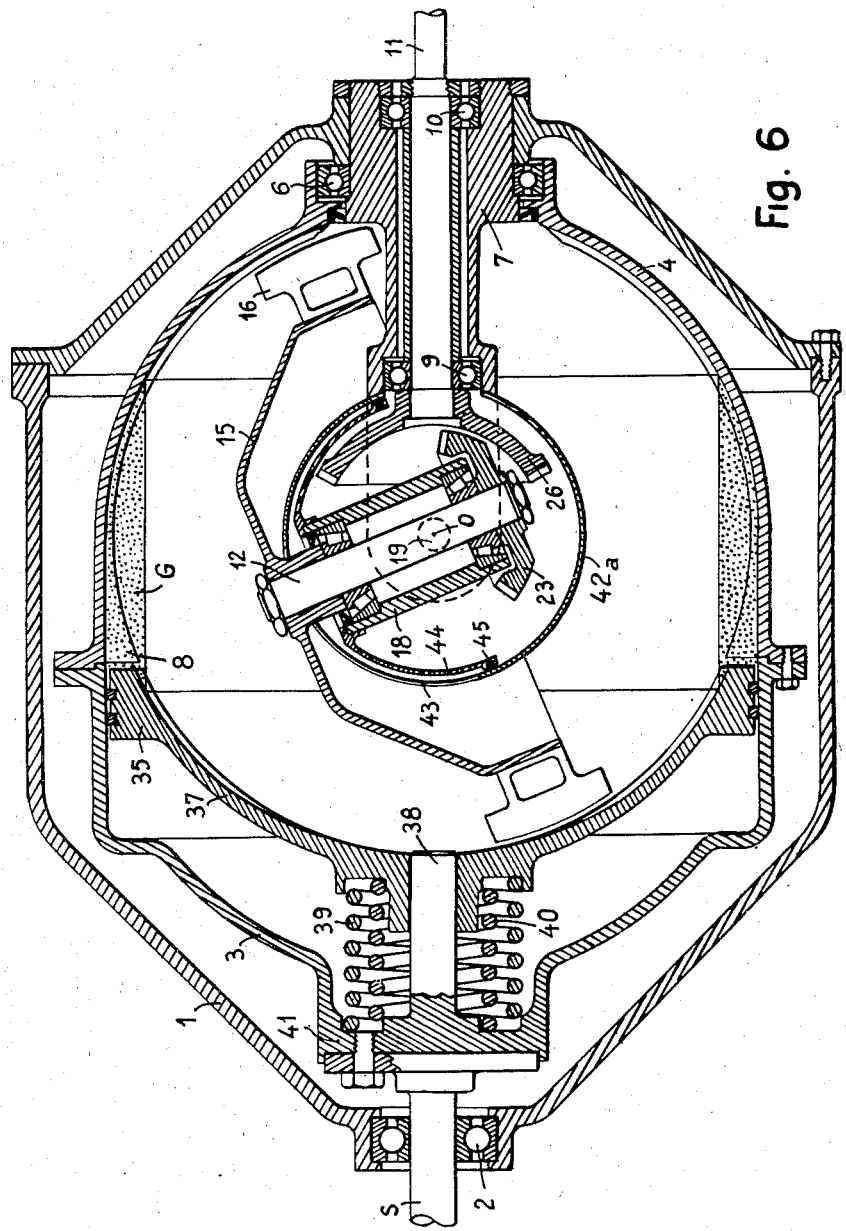

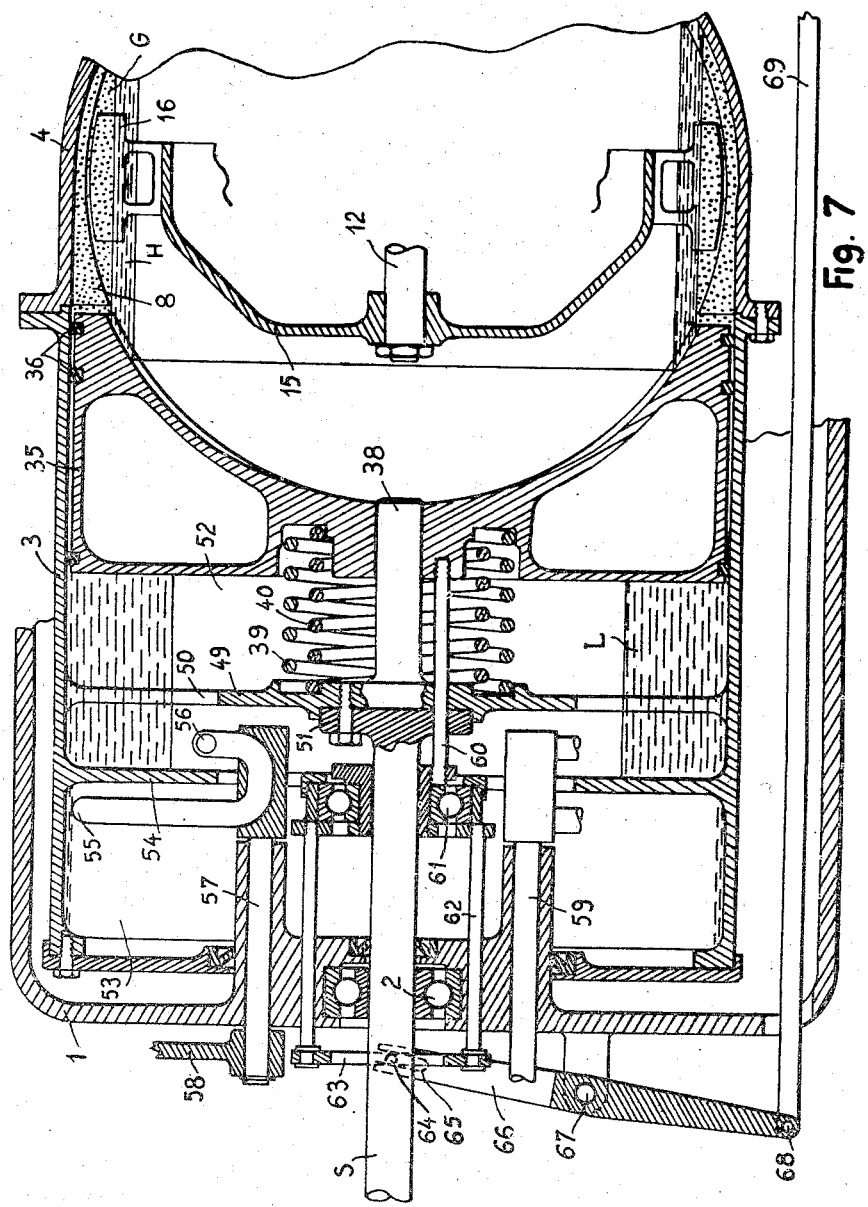

United States Patent Office

2,826,285
Patented Mar. 11, 1958

2,826,285

TRANSMISSION SYSTEM ADAPTED TO FORM A TORQUE CONVERTER

François Marie Michel Bernard Salomon, Paris, France

Application July 31, 1956, Serial No. 601,304

Claims priority, application France August 5, 1955

11 Claims. (Cl. 192—3.5)

My invention has for its object a transmission system adapted to form a torque converter operating in a continuously varying manner and applicable to an extremely large number of industries.

It is applicable to stationary machines and to vehicles of any description. It is also applicable to various control devices, chiefly for the control of turrets, rudders, trap-doors for ore hoppers, etc.

The first object of my invention consists, with a view to obtaining a high efficiency, in producing under normal running conditions a transmission operating substantially with complete connection, i. e. with a geometrically well defined value for the ratio between the angular speeds of the driving and driven shafts, without any shifting with reference to said value.

This result is not obtained in most known torque converters and in particular it cannot be obtained in most hydraulic torque converters.

A second object of my invention consists in using also for obtaining an excellent efficiency a mellow substance (such as granular substance) as a driving agent which is subjected to no circulatory movement and moves bodily with the rotary driving member. On the contrary the usual hydraulic converters use a circulating liquid, the circulation of which leads of necessity to a loss of energy.

According to my invention, there are no reciprocatory or eddying movements produced.

A further object of my invention consists in modifying the ratio between the angular speeds of the driven shaft and of the driving shaft in a very simple gradual manner as required by the driver or automatically.

I chiefly resort—as mellow substance—to a granular substance—such as granular metal—subjected to the centrifugal forces developed by the rotation of a casing rigid with the driving shaft, said granular substance moving substantially bodily with said rotary casing.

The granular substance subjected to centrifugal forces acts, while remaining substantially rigid with the rotary casing, on the blades of a driven member which I will term hereinafter the driven blades.

The rotary casing and the driven member have generally rotary axes which converge towards a common point. The geometrical axis of the driven member may lie in a particular embodiment in alignment with the geometrical axis of the rotary driving casing and consequently of the driving shaft. In this particular case, the angular speed of the driven shaft is equal, under normal running conditions, to that of the driving rotary casing.

Generally speaking, the geometrical axis of the driven shaft converges with the axis of the driving shaft but does not form an extension of the latter. In such a case, as will be explained hereinafter, the angular speed V of the driven shaft is not equal to the angular speed U of the driving shaft. This angular speed V is, as shown hereinafter, defined geometrically by the equation:

(1) $$V = U \cos \varphi$$

$\varphi$ being the angle between the axis of the driven shaft and the axis of the driving casing and shaft.

Obviously these results are obtained under normal running conditions only, i. e. when the angular speed of the driving shaft has reached a value such that the centrifugal forces developed by its rotation are sufficiently high.

The Equation 1 shows that the ratio between the angular speeds V and U, i. e. $V/U$ is equal to $\cos \varphi$ (i. e. the cosinus of the angle between the driving shaft and the driven shaft).

It is therefore sufficient to make said angle vary in a gradual manner so as to obtain a continuous modification of the ratio between the angular speeds.

The apparatus forms thus a torque transformer operating with a continuous variation in speed.

In particular, when $\varphi = 0$ and $\cos \varphi = 1$, the Equation 1 leads to the equality $U = V$. The apparatus, in these conditions, becomes a clutch which is furthermore automatic, since it drives only when the angular speed of the driving shaft has reached a sufficiently high value.

Generally speaking, the driven shaft is not the actual receiver shaft, since for many applications, the receiver shaft subjected to the useful resisting torque assumes an unvarying direction.

The driven shaft the direction of which varies (since it forms an angle $\varphi$ which varies with reference to the axis of the driving shaft) is therefore connected with the receiver shaft having an unvarying direction through a suitable transmission (generally a gearing).

In many cases, the rotary driving casing carries along with it during its rotation together with the granular substance a suitable amount of oil which is thus subjected to centrifugal action and which cooperates in improving the efficiency of the converter as will be shown hereinafter.

The arrangement according to my invention differs essentially from all known prior arrangements incorporating granular substances subjected to centrifugation, which form rather clutches and cannot act in any case as torque converters with a high efficiency, and furthermore their operation differs deeply for many reasons from the operation of the apparatus according to my invention.

In particular, in the case of my invention, the centrifugally moving granular substance does not operate through a wedging action, but only through adherence between the succession layers of granular substance and I resort for driving purposes to the properties of solid friction between the granules of the granular substance under conditions to be disclosed hereinafter, the granular substance being subjected to centrifugal force and simultaneously, in a preferred manner, to the pressure of an oil annulus.

With a view to obtaining a particularly high efficiency, I adjust preferably in an automatic manner the level of the mellow substance (eventually, granular substance) subjected to centrifugation so that, during the relative shifting between the driven blades and the mellow substance, the friction may be as low as possible.

Further advantageous features and objects of my invention will appear in the reading of the following description of various embodiments illustrated in the accompanying drawings. In said drawings given by way of a mere exemplification, so as to allow a better understanding of the invention and by new means in a limiting manner.

Fig. 1 is a longitudinal cross-sectional view of a first embodiment;

Fig. 2 is an explanatory diagram;

Fig. 6 is a longitudinal sectional view through a plane perpendicular to that of Fig. 1, for a position in which axis of the driven member forms a large angle with the axis of the rotary casing.

Fig. 7 is a partial longitudinal cross-sectional view showing an auxiliary control device for the level of the centrifugally moving granular substance.

Figure 4:
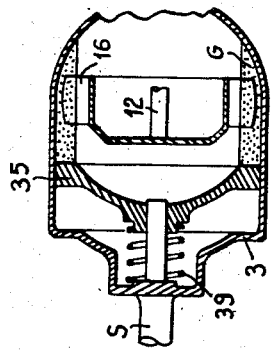
Figs. 4 and 5 are diagrammatic longitudinal sectional views on a reduced scale.

In Fig. 1, a stationary casing 1 encloses and carries the apparatus. The driving shaft S is carried inside a bearing 2 rigid with said stationary casing 1. Said driving shaft drives a movable casing including the members of revolution 3 and 4 which are interconnected by the screws 5.

The casing member 4 is centrally fitted over the second bearing 6 carried by a stationary sleeve 7 rigid with stationary casing 1.

The system including the members of revolution 3 and 4 forms what I will term hereinafter a rotary casing or driving casing. Said rotary casing carries preferably blades 8 which further the drive of the granular substance.

Inside the sleeve 7 are secured two further bearings 9 and 10 carrying the receiver shaft 11 the direction of which is unvarying.

I will now show how the receiver shaft 11 is driven by the shaft 12 which is termed hereinabove the driven shaft.

The driven shaft 12 is an intermediate shaft of a varying angular setting forming an angle $\varphi$ with the geometrical axis of the driving shaft and drives the receiver shaft 11 having an unvarying direction.

In the particular position illustrated in Fig. 1, the angle $\varphi$ is equal to zero and the driven shaft 12 is aligned with the driving shaft S.

Figure 3:
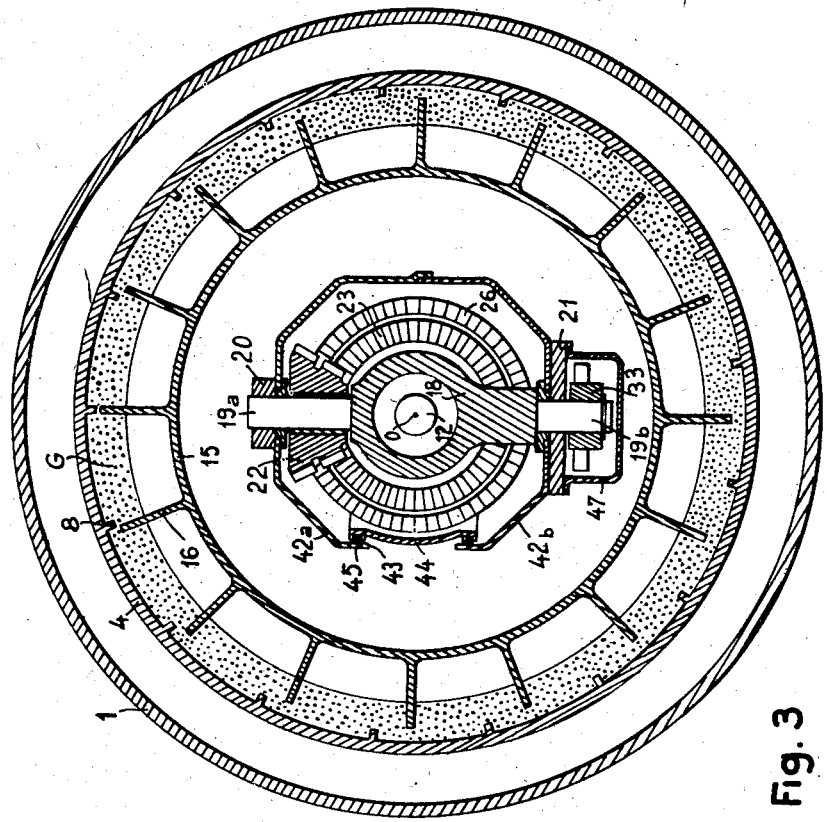
Fig. 3 is a sectional view through line A—A' of Fig. 1.

The drive of the receiver shaft through the driven shaft is provided in the case illustrated in Fig. 1 by means of a gearing. The driven shaft 12 is rigid with a cap 15 in the shape of a body of revolution through the agency of a nut 13 and of a key 14. The cap 15 is provided with blades 16 forming the driven blades. Fig. 3 which is a cross-section of Fig. 1 shows said blades edgewise.

I have referred hereinabove to the fact that the shaft 12 forming a variable angle with the axis of the driving shaft drives the receiver shaft 11 having an unvarying direction through the agency of a gearing. Said gearing is constituted as follows: the shaft 12 is carried by two bearings 17a and 17b and these bearings are in their turn carried by a sleeve 18 rigid with two trunnions 19a and 19b having a common geometrical axis perpendicular to the axis of the driven shaft 12.

These trunnions 19a and 19b are revolubly fitted in bearings forced in the arms 20 and 21 which latter are rigid with the stationary sleeve 7. Said arms 20 and 21 are thus rigid with the stationary casing 1 and with the frame of the apparatus.

Over the trunnion 19a is revolubly mounted a bevel pinion 22 provided with two series of teeth meshing respectively with the pinion 23 rigidly secured to the shaft 12 through the agency of a key 24 and of a nut 25 and with the toothed wheel 26 rigid with the receiver shaft 11.

Under such conditions, if the position of the shaft 12 is suitably defined in the manner disclosed hereinafter, the rotation of the shaft 12 drives the bevel pinion 22 through the pinion 23 and in its turn the pinion 22 drives the toothed wheel 26 rigid with the receiver shaft 11.

The receiver shaft 11 is thus driven by the driven shaft 12 when the latter is driven by the driving shaft, the connection between the driven and driving shaft being disclosed hereinafter.

I will now show how it is possible to modify the angle $\varphi$ formed by the axis of the driven shaft 12 with the geometrical axis of the driving shaft S. This modification of said angle is obtained through a rotary rod 27 extending through the sleeve 7 and guided by the latter. This rod 27 carries a pinion 28 meshing with a pinion 29 rigid with a rotary rod 30 guided by a projecting section 31 rigid with the stationary arm 21.

The rotary rod 30 carries a further pinion 32 meshing with a toothed sector 33. The latter is rigidly secured through a key 34 to the trunnion 19b forming part of the sleeve 18 and revolubly carried in the arm 21.

Under such conditions, when the rod 27 is driven into rotation from the outside, this causes the sector 33 to pivot through the agency of the pinions 28, 29, 32 and consequently the axis of the sleeve 18 is caused to rock together with shaft 12 which rotates with the sleeve 18 with reference to the axis of the driving shaft S. This provides thus for a modification of the above referred to angle $\varphi$. The value of said angle $\varphi$ may be controlled from the outside by the operator who acts to this end directly or indirectly on the rod 27 so as to make it turn.

It has been mentioned hereinabove and it will be seen hereinafter that the ratio between the angular speeds of the driving and driven shaft S and 11 depends on this angle $\varphi$.

The operation of the arrangement is as follows:

The driving shaft S drives the rotary casing 3—4 which, through its driving blades, causes the granular substance G to revolve with it. Under the action of centrifugal forces, the inner surface of the granular substance assumes the shape of a cylinder of revolution having for its geometrical axis the geometrical axis of the driving shaft S. A generating line X—Y of said cylinder is illustrated in Fig. 1.

As soon as the angular speed U of the driving shaft has acquired a sufficient value, depending on the conditions of application, the granular substance G acts as a centrifugal mass which forms substantially a unit with the driving casing and does not move with reference to the latter.

The granular substance G exerts on the blades 16 carried by the driven shaft 12 stresses which are sufficiently important for driving said shaft 12.

In the case of Fig. 1, the driven shaft 12 has the same geometrical axis as the driving shaft S and consequently $\varphi=0$ (cos $\varphi=1$).

The driven shaft 12 assumes an angular speed equal or substantially equal to that of the driven shaft S. It transmits its movement to the receiver shaft 11 through the agency of the gearing 23, 22, 26.

Now, if the operator wishes to make the receiver shaft rotate more slowly than precedingly for a same angular speed of the driving shaft, he causes the rod 27 to turn through a certain angle (Fig. 1) through the agency of control means which are not illustrated and possibly of an auxiliary control motor.

As mentioned hereinabove, the rotation of the rod 27 modifies the angle between the axis of the driven shaft and the axis of the driving shaft. Consequently the axis of the driven shaft 12 forms now an angle $\varphi$ different from zero with the axis of the driving shaft S.

I will now disclose why the relationship between the angular speed U of the driving shaft S and the angular speed V of the driven shaft 12 is that given hereinabove, to wit: $V = U \cos \varphi$.

In the diagram of Fig. 2 which is to further the understanding of this relationship:

O—S is the projection of the axis of the driving shaft.

O—T is the projection of the axis of the driven shaft 12.

These axes converge at a point O and form with each other an angle $\varphi$.

Considering now the apex $M_1$ of the driven blade 16 which is located at the moment considered in alignment with the extension of the axis of the trunnions 19a and 19b (Figs. 1 and 2) and which consequently is projected at 0, Fig. 2 shows the development of the cylindrical surface of the granular substance G and of the driven blades 16 in the vicinity of the apex $M_1$. These driven blades are illustrated at the moment considered at the points $M_1$, $M_2$, $M_3$, $M_4$, $M_5$, etc.

Considering the linear speed of a granular particle at $M_1$ at the moment considered, its linear speed is equal to $R \times U$, R being the radius $O - M_1$. This linear speed $R \times U$ is illustrated in Fig. 2 by the vector $\overline{M_1P} = R \times U$. Said vector is decomposed into two vectors $\overline{M_1Q}$ and $\overline{QP}$.

The vector $\overline{M_1Q}$ is perpendicular to the driven blade 16 and consequently perpendicular to the axis OT of the driven shaft 12 while the vector $\overline{QP}$ is parallel with the driven blades 16. The following vectorial equation is true.

$$\overline{M_1P} = \overline{M_1Q} + \overline{QP}$$

On the other hand, $\varphi$ being as precedingly the angle between the axis OT of the driven shaft 12 and the axis OS of the driving shaft S, the following equation is true:

$$\overline{M_1Q} = \overline{M_1P} \cos \varphi$$

The vector $\overline{M_1Q}$ illustrates the linear driving speed due to the rotation of the driven shaft 12 having OT as an axis. In other words $\overline{M_1Q}$ is the linear speed of the point of the blade 16 coinciding at a given moment with the granular particle considered.

This linear speed is equal to $R \times V$, V being the angular speed of the driven shaft 12. The following equations are therefore true:

$$RV = RU \cos \varphi$$

and consequently $$V = U \cos \varphi$$

These arguments relate obviously only to the driven blade which at the moment considered registers with the point $M_1$.

Considering at a same moment the points $M_2$, $M_3$, $M_4$, $M_5$, etc., calculation proves that the law is the same as for the blade $M_1$, to wit: $V = U \cos \varphi$.

Considering now the granules which are not on the medial line C constituted in Fig. 2 by the projection of the circle passing through $M_1$ and having for its axis OT and which are slightly spaced with reference thereto, the law remains substantially the same: $V = U \cos \varphi$.

Finally, at every moment, the different granules revolve in unison with the driving shaft and form practically a unit with the latter.

Simultaneously, the driven blades 16 move inside the granular substance and each granule or particle assumes in addition to its linear driving speed $\overline{M_1Q}$ produced through the rotation of the driven shaft a relative linear speed $\overline{QP}$ inside the granular substance.

As disclosed hereinabove, the ratio between the angular speeds V and U is actually that given by the Equation 1 to wit $$\frac{V}{U} = \cos \varphi$$

This ratio varies in a continuous manner when the value of the angle $\varphi$ is modified in a continuous manner, which is readily obtained by turning the rod 27.

The apparatus forms thus a continuous torque converter which constitutes in fact in a particular case a simple clutch when $\varphi = 0$ and $\cos \varphi = 1$. It is of considerable interest for the friction arising through a shifting of each particle or granule along the driven blades 16, the speed of which shifting is illustrated in Fig. 2 by the vector $\overline{QP}$, to be as small as possible.

With a view to reducing said friction, it is generally useful to subject to centrifugation through the driving casing and together with the granules (or the like mellow substance) a certain amount of oil which produces automatically a lubrication under pressure of the surfaces of the driven blades. It is also possible, if required, to cut lubricating channels in the blades 16.

Furthermore, the thickness of the layer of granules should be sufficient for driving purposes, while it should always be reduced to a minimum so as to obtain always an excellent efficiency for the apparatus.

Fig. 1 illustrates the arrangement provided for this purpose.

Inside the cylindrical portion of the casing section 3 and in front of the centrifugated granular substance, is provided a piston-shaped member 35 provided with packing rings 36 and rigid with the spherical cap 37. Said piston-shaped member 35 rotates in unison with said casing section 3 and may move translationally with reference thereto. The cap 37 carrying the piston-shaped member is centered by means of a cylindrical extension 38 of the casing section 3 so as to allow the longitudinal movement of the piston-shaped member 35 and of its carrier cap 37, said cylindrical extension of the section 3 being coaxial with the driving shaft S.

The piston-shaped member 35 is urged towards the left hand side of Fig. 1 by the granular substance subjected to the centrifugal forces arising through the rotation of the shaft. The thrust thus exerted on the piston-shaped member is balanced by the springs 39 and 40 which engage the outer end 41 of the section 3.

When the angular speed U of the driving shaft increases, the centrifugal forces increase proportionally with the square of U and and consequently the stresses exerted on the driven blades 16 increase proportionally with the square of the speed U and become much larger than would be normally required.

It is therefore of interest to reduce the friction produced by the relative movements of the blades 16 inside the granular substance by reducing the thickness of said granular substance. Now, the piston-shaped member 35 moves towards the left hand side of Fig. 1 while compressing the springs 39 and 40 by an amount which depends on the speed of the driving shaft and on the gauging of the springs.

Figure 5:
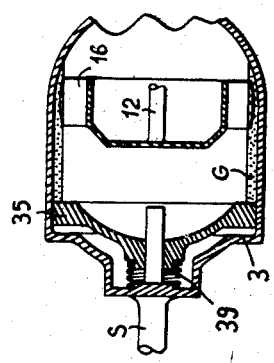

The diagrammatic Figs. 4 and 5 show that this leads to a reduction in the thickness of the layers of granular substance in accordance with a predetermined law.

In order to prevent the granular substance from engaging the bevel wheels, the latter are enclosed in suitable casings which are more particularly visible in Figs. 1, 3 and 6, Fig. 3 being a cross-section through line A—A' of Fig. 1. A first casing protects the gears 22, 23, 26 and the bearings 17a and 17b and it includes a stationary case constituted by two caps 42a and 42b (Figs. 1, 3, 6) rigid with the arms 20 and 21, said case being provided with an elongated opening 43 (Figs. 3 and 6) in view to allow the passage of the sleeve 18.

A metal sheet 44 rigid with the sleeve 18 closes the opening 43 whatever may be the value of the angle $\varphi$. Fluid tightness is ensured by a yielding packing 45 inserted between the metal sheet 44 and the caps 42a and 42b. Furthermore, a packing 46 protects the bearing 17a (Fig. 1).

A second casing protects the toothed sector 33 and the associated gears 32, 29 and 28. It is constituted by a stamped metal sheet 47 (Figs. 1 and 3) rigid with the arm 21 and the sleeve 7. A packing 48 protects the bearing 6 (Fig. 1).

When the driven blades 16 are carried along by the granular substance, said granular substance driven through the driving casing forms a unit through adherence of the different layers thereof in contact with each other. This adherence is obtained as a consequence of the laws of solid friction which govern mellow substances and the coefficient of friction is very high, which is a highly favorable condition.

At the same time, the driven blades 16 are subjected to relative displacements with reference to the granular substance except when φ=0.

Figure 8:
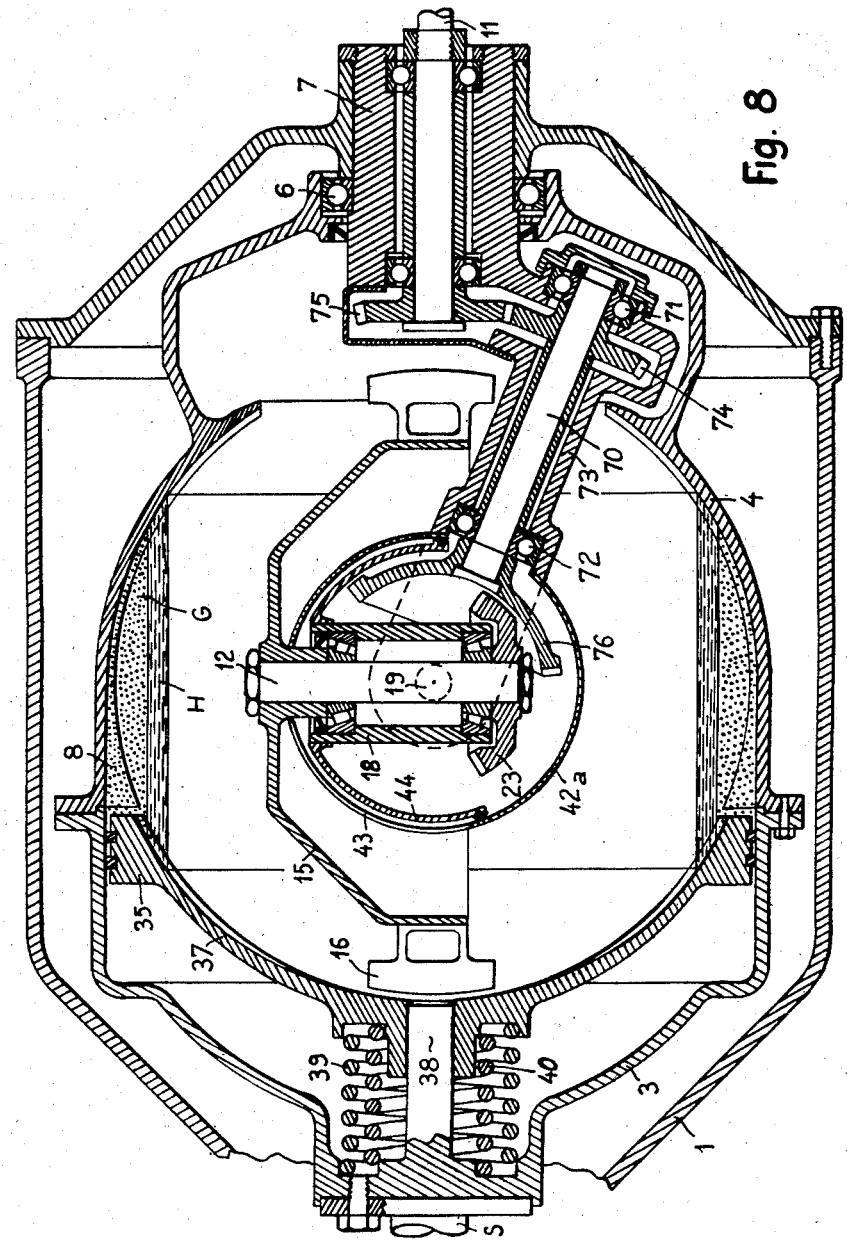
Fig. 8 is a longitudinal sectional view of an arrangement wherein a supplementary shaft is inserted between the driven shaft and the actual receiver shaft, the axis of the driven shaft forming possibly an angle of 90° with the axis of the rotary casing.

In this latter case, in contradistinction, the frictional coefficient between the highly polished surfaces of the blades 16 and of the granular substance is very low which is also a very favorable feature. This coefficient of friction is all the smaller since, in most cases, there is introduced into the driving casing an oil which forms between the ring constituted by the centrifugally projected mellow substance and the rotary axis of the casing an annulus of centrifugal oil which produces a lubrication under pressure of the surfaces of the blades 16 in contact with the granular substance. This oil annulus is not illustrated in Figs. 1, 3, 4, 5, 6, but is illustrated in Figs. 7 and 8.

Fig. 6 is a cross-section of the arrangement illustrated in Fig. 1 in a plane perpendicular to the plane of said Fig. 1, the section line coinciding with the axis of the driving shaft S.

The axis of rotation of the trunnions 19a, 19b carrying the sleeve 18 is projected in said Fig. 6 at the point of intersection 0 between the axes of the driving shaft S and of the driven shaft 12.

Fig. 6 shows the maximum allowed value for the angle φ without the driven blades 16 touching the sleeve 7.

Fig. 7 is a longitudinal sectional view similar to Fig. 1 and which is not different therefrom in the portion of the arrangement located on the right hand side of the figures. What is novel in the case of Fig. 7 is the fact that it includes an auxiliary control system adapted to control on the one hand the location of the piston-shaped member 35 and on the other hand the value of the angle φ.

In Fig. 7, the driving casing 3 is connected with the driving shaft S by a partition 49 provided with large openings 50. The partition 49 is secured to the driving shaft by the coupling plate 51.

The rotary driving casing encloses two compartments 52 and 53 separated by a partition 54 carried by the inner wall of the casing section 3.

These two compartments are intended to receive a certain amount of centrifugally projected oil which occupies a varying volume in each of said compartments as provided by the oil-transferring means to be described hereinafter. The centrifugally projected oil contained in the compartment 52 acts on the piston-shaped member 35 in the same direction as the springs 39 and 40 and furthers thus the action of said springs so as to urge the piston 35 towards the right hand side and thereby to increase the thickness of the layer of granular substance. This reinforcing action is consequently all the more intense when the amount of oil is larger inside the compartment 52.

The oil-transferring means includes two systems of which one is illustrated in the upper left hand portion of Fig. 7 and includes a collecting scoop 55 adapted to remove the centrifugally projected oil out of the compartment 53 so as to transfer it through the pipe 56 into the compartment 52. The operation of this collecting scoop is controlled through the rotation of the spindle 57 rigid with the pipe 56, the rotation of said spindle being controlled by a lever 58 operable from the outside of the arrangement.

The second system of the oil-transferring means is partly visible in the lower left hand part of Fig. 7. It is quite similar to that which has just been described and operates so as to draw oil out of the compartment 52 and to return it into the compartment 53. It is controlled from the outside of the apparatus through rotation of the spindle 59.

Furthermore the movements of the piston-shaped member 35 produce an automatic control of the angular setting of the driven shaft 12 and provide consequently for a control of the angle φ.

To this end, the bottom of the piston-shaped member 35 is connected through rods 60 of which only one is shown in Fig. 7 with a thrust bearing 61 adapted to slide in parallelism with the axis of the driving shaft S.

The thrust bearing 61 controls during this sliding movement a ring 63 through the agency of the rods 62, said ring 63 carrying studs 64 acting on the angular location of the pivoting fork 65. Said fork is carried by a lever 66 pivoting round a pivot 67 rigid with the stationary casing 1. The said lever 66 is pivotally connected at its other end 68 with a rod 69 which acts, on the other hand, through connections which are not illustrated on the rotary rod 27 (Fig. 1) which controls the variations of the angle φ. Under such conditions, it is possible for the operator to use the oil transferring device so as to modify the ration $V/U$ between the angular speeds, which ratio is equal to cos φ and at the same time to act automatically on the level of the centrifugally projected granular substance so as to give the thickness of the latter the optimum value consistent with the obtention of the force required for driving purposes. This cooperates in the obtention of a maximum efficiency.

It is thus possible to provide various laws for the automatic control of said angle φ and consequently of the ratio $V/U$.

I have illustrated at H in Fig. 7 an annulus of centrifugally projected oil providing for the lubrication under pressure of the blades 16 during their movement with reference to the granular substance.

Fig. 8 shows an embodiment which is quite similar to that illustrated in Figs. 1, 3 and 6, with the addition however of a supplementary shaft 70 between the driven shaft and the actual receiver shaft. The object of this supplementary shaft consists chiefly in providing enough room for increasing to a maximum the angle φ without the driven blades 16 touching the sleeve 7. In Fig. 8, said supplementary shaft 70 is shown as carried by two bearings 71 and 72, which latter are carried by an auxiliary casing 73 rigid with the sleeve 7. The shaft 70 carries at one end a pinion 74 meshing with a pinion 75 keyed to the receiver shaft 11. It carries at its other end a toothed wheel 76 similar to the toothed wheel 26 shown in Figs. 1 and 6 and driven by the pinion 23 rigid with two series of teeth not illustrated, said bevel pinion being similar to the pinion 22 of Fig. 1 and meshing with the opinions 76 and 23.

As a result of the arrangement described, the space left free for the movement of the driven blades is considerably increased as will be readily apparent.

Consequently, the maximum value allowable for the angle φ is considerably increased without the driven blades touching the stationary casing. In Fig. 8, the geometrical axis of the driven shaft 12 is perpendicular to the geometrical axis of the driving shaft. In other words, the angle φ is equal to $$\frac{\pi}{2}$$

Consequently, cos φ=0 and $V$=0. The angular speed V of the control shaft being thus equal to zero, said driven shaft is disengaged.

In this case, illustrated in Fig. 8, the torque converter allows obtaining a large range of modifications since the ratio $V/U$ may vary in a continuous manner between 1 and zero.

By increasing still further the slope of the axis of the auxiliary shaft 70 with reference to the geometrical axis of the driving shaft S, I may obtain for the angle a value above $$\frac{\pi}{2}$$

The equation $$\frac{V}{U}=\cos \varphi$$

still remains valid.

I have shown at H an annulus of centrifugally projected oil which provides for the lubrication under pressure of the blades 16.

My invention is capable of numerous modifications. In particular, the mellow centrifugally projected substance may be constituted by granular substance or a plurality of granular substances of any desired particle magnitude ranging between fine or very fine pulverulent granular substances and particles having diameters of several millimeters, whether spherical or otherwise, and even more.

The mellow centrifugally projected substance may include granular material in the broader meaning of the expression whatever may be its particle magnitude and/or one or more liquids or pastes of various natures and viscosities.

In particular, it is possible in certain cases to resort to graphite, molybdenum bisulfur, or the like powders, whether singly or in admixture with one another or with granular substance or the like. I may also use as a centrifugal mellow substance various liquids, fluid, semifluid, or thick oils, lubricants, silicones, etc. and generally speaking any mellow substances and possible any mixture of mellow substances according to the applications considered.

The blades on the driving casing may in certain cases be omitted, chiefly if the inner surface of the driving casing is sufficiently rough.

It is also possible, if desired, to make the driving and receiver shafts play respectively the part of receiver and driving shafts respectively. The slope $\varphi$ may be controlled by any desired means other than those described hereinabove by resorting in particular to any known auxiliary controls whether hydraulic, pneumatic, electric, mechanic, or the like, said controls being positioned inside or outside the apparatus. Such a control of the slope may include gauged elastic sections, chiefly gauged springs.

What I claim is:

1. A transmission system adapted to form a torque converter including a rotary driving shaft, a rotary casing rigid with said driving shaft, a stationary casing, bearings carried by the stationary casing and revolubly carrying the ensemble including the rotary shaft and the rotary casing, a mellow substance contained in said rotary casing and subjected to centrifugal action through the rotation of said rotary casing, at least one pair of coaxial bearings assuming a variable slope at an angle $\varphi$ with the geometrical axis of the driving shaft and carried by the stationary casing, a driven shaft revolubly carried by said pair of coaxial bearings, driven blades carried by the driven shaft and the outer ends of which engage the said mellow substance, at least one receiver shaft revolubly carried by the stationary casing and the direction of the axis of which is unvarying, means for transmitting the rotation of the driven shaft to the receiver shaft and means for modifying the said angle $\varphi$.

2. A transmission system adapted to form a torque converter including a rotary driving shaft, a rotary casing rigid with said driving shaft, a stationary casing, bearings carried by the stationary casing and revolubly carrying the ensemble including the rotary shaft and the rotary casing, a mellow substance contained in said rotary casing and subjected to centrifugal action through the rotation of said rotary casing, at least one pair of coaxial bearings assuming a variable slope at an angle $\varphi$ with the geometrical axis of the driving shaft and carried by the stationary casing, a driven shaft revolubly carried by said pair of coaxial bearings, driven blades rigidly carried by the driven shaft and the outer ends of which engage the said mellow substance, at least one receiver shaft revolubly carried by the stationary casing and the direction of the axis of which is unvarying, means for transmitting the rotation of the driven shaft to the receiver shaft and means for modifying the said angle $\varphi$.

3. A transmission system adapted to form a torque converter including a rotary driving shaft, a rotary casing rigid with said driving shaft, a stationary casing, bearings carried by the stationary casing and revolubly carrying the ensemble including the rotary shaft and the rotary casing, a mellow substance contained in said rotary casing and subjected to centrifugal action through the rotation of said rotary casing, means for preventing substantially any relative movement of said mellow substance with reference to the rotary casing, a certain quantity of lubricant also contained in said rotary casing and subjected to centrifugal action through the rotation of said rotary casing, at least one pair of coaxial bearings assuming a variable slope at an angle $\varphi$ with the geometrical axis of the driving shaft and carried by the stationary casing, a driven shaft revolubly carried by said pair of coaxial bearings, driven blades carried by the driven shaft and the outer ends of which engage the mellow substance, at least one receiver shaft revolubly carried by the stationary casing and the direction of the axis of which is unvarying, means for transmitting the rotation of the driven shaft to the receiver shaft and means for modifying the said angle $\varphi$.

4. A transmission system adapted to form a torque converter including a rotary driving shaft, a rotary casing rigid with said driving shaft, a stationary casing, bearings carried by the stationary casing and revolubly carrying the ensemble including the rotary shaft and the rotary casing, a mellow substance contained in said rotary casing and subjected to centrifugal action through the rotation of said rotary casing, means for preventing substantially any relative movement of the mellow substance with reference to the rotary casing, at least one pair of coaxial bearings assuming a variable slope at an angle $\varphi$ with the geometrical axis of the driving shaft and carried by the stationary casing, a driven shaft revolubly carried by said pair of coaxial bearings, driven blades carried by the driven shaft and the outer ends of which engage the mellow substance, the angular speed V of the driven shaft being equal to the angular speed U of the driving shaft multiplied by cos $\varphi$, at least one receiver shaft revolubly carried by the stationary casing and the direction of the axis of which is unvarying, means for transmitting the rotation of the driven shaft to the receiver shaft and means for modifying the said angle $\varphi$.

5. A transmission system adapted to form a torque converter including a rotary driving shaft, a rotary casing rigid with said driving shaft, a stationary casing, bearings carried by the stationary casing and revolubly carrying the ensemble including the rotary shaft and the rotary casing, a mellow substance contained in said rotary casing and subjected to centrifugal action through the rotation of said rotary casing, means for preventing substantially any relative movement of the mellow substance with reference to the rotary casing, at least one pair of coaxial bearings assuming a variable slope at an angle $\varphi$ with the geometrical axis of the driving shaft and carried by the stationary casing, a driven shaft revolubly carried by said pair of coaxial bearings, driven blades carried by the driven shaft and the outer ends of which engage the mellow substance, at least one receiver shaft revolubly carried by the stationary casing and the direction of the axis of which is unvarying, means for transmitting the rotation of the driven shaft to the receiver shaft, means for modifying the said angle $\varphi$, a piston-shaped member rotating with the rotary casing and adapted to move with reference to the latter in a direction parallel with the axis of the driving shaft, one face of said piston-shaped member pushing the centrifugated mellow substance and gauged elastic means acting on the other face of said piston.

6. A transmission system adapted to form a torque converter including a rotary driving shaft, a rotary casing rigid with said driving shaft, a stationary casing, bearings carried by the stationary casing and revolubly carrying the ensemble including the rotary shaft and the rotary casing, a mellow substance contained in said rotary casing and subjected to centrifugal action through the rotation of said rotary casing, means for preventing substantially any relative movement of the mellow substance with reference to the rotary casing, at least one pair of coaxial bearings assuming a variable slope at an angle $\varphi$ with the geometrical axis of the driving shaft and carried by the stationary casing, a driven shaft revolubly carried by said pair of coaxial bearings, driven blades carried by the driven shaft and the outer ends of which engage the mellow substance, at least one receiver shaft revolubly carried by the stationary casing and the direction of the axis of which is unvarying, means for transmitting the rotation of the driven shaft to the receiver shaft, means for modifying the said angle $\varphi$, piston-shaped member rotating with the rotary casing and adapted to move with reference to the latter in direction parallel with the axis of the driving shaft, one face of said piston-shaped member pushing the centrifugated mellow substance, at least one auxiliary container formed in the rotary casing between a wall of the latter and the second face of the piston-shaped member, a certain amount of liquid contained in said auxiliary container and projected centrifugally by the rotation of the rotary casing and means for adjusting the amount of liquid contained in said auxiliary container.

7. A transmission system adapted to form a torque converter including a rotary driving shaft, a rotary casing rigid with said driving shaft, a stationary casing, bearings carried by the stationary casing and revolubly carrying the ensemble including the rotary shaft and the rotary casing, a mellow substance contained in said rotary casing and subjected to centrifugal action through the rotation of said rotary casing, means for preventing substantially any relative movement of the mellow substance with reference to the rotary casing, at least one pair of coaxial bearings assuming a variable slope at an angle $\varphi$ with the geometrical axis of the driving shaft and carried by the stationary casing, a driven shaft revolubly carried by said pair of coaxial bearings, driven blades carried by the driven shaft and the outer ends of which engage the mellow substance, at least one receiver shaft revolubly carried by the stationary casing and the direction of the axis of which is unvarying, means for transmitting the rotation of the driven shaft to the receiver shaft, means for modifying the said angle $\varphi$, a piston-shaped member rotating with the rotary casing and adapted to move with reference to the latter in a direction parallel with the axis of the driving shaft, one face of said piston-shaped member pushing the centrifugated mellow substance, at least one auxiliary container formed in the rotary casing between a wall of the latter and the second face of the piston-shaped member, a certain amount of liquid contained in said auxiliary container and projected centrifugally by the rotation of the rotary casing, at least one further auxiliary container formed inside the rotary casing and liquid transferring means adapted to transfer liquid from the first container into the further auxiliary container and reversely.

8. An apparatus as set forth in claim 1, in which the centrifugated mellow substance comprises a granular material.

9. An apparatus as set forth in claim 1, in which the centrifugated mellow substance comprises fluids.

10. An apparatus as set forth in claim 1, in which the centrifugated mellow substance comprises at least one pasty substance.

11. A transmission system adapted to form a torque converter including a rotary receiver shaft, a rotary casing rigid with said receiver shaft, a stationary casing, bearings carried by the stationary casing and revolubly carrying the ensemble including the rotary receiver shaft and the rotary casing, a mellow substance contained in said rotary casing, a driving shaft carried by the stationary casing, at least one pair of coaxial bearings assuming a variable slope at an angle $\varphi$ with the geometrical axis of the receiver shaft and carried by the stationary casing, an intermediary shaft revolubly carried by the said bearings, blades carried by the intermediary shaft and the outer ends of which engage the mellow substance, means for transmitting the rotation of the driving shaft to said intermediary shaft and means for modifying said angle $\varphi$.

References Cited in the file of this patent
UNITED STATES PATENTS

| | | |
|---|---|---|
| 1,931,209 | Rudqvist | Oct. 17, 1933 |
| 1,965,109 | Rudqvist | July 3, 1934 |
| 2,032,966 | Yoxall | Mar. 3, 1936 |